US008977841B2

(12) United States Patent
Tateishi et al.

(10) Patent No.: US 8,977,841 B2
(45) Date of Patent: Mar. 10, 2015

(54) SENDING MESSAGES BY OBLIVIOUS TRANSFER

(71) Applicant: International Business Machines Corporation, Armonk, NY (US)

(72) Inventors: Takaaki Tateishi, Tokyo (JP); Yuji Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 13/706,672

(22) Filed: Dec. 6, 2012

(65) Prior Publication Data

US 2013/0159696 A1 Jun. 20, 2013

(30) Foreign Application Priority Data

Dec. 16, 2011 (JP) .................................. 2011-276118

(51) Int. Cl.
*H04L 9/08* (2006.01)
*H04L 9/14* (2006.01)
*H04L 9/30* (2006.01)

(52) U.S. Cl.
CPC .. *H04L 9/08* (2013.01); *H04L 9/14* (2013.01); *H04L 9/3006* (2013.01); *H04L 2209/50* (2013.01)
USPC ....................................................... 713/150

(58) Field of Classification Search
CPC ................................................. G06F 21/6218
USPC ................................... 713/150, 190; 709/206
See application file for complete search history.

(56) References Cited

U.S. PATENT DOCUMENTS

| 2007/0081664 | A1* | 4/2007 | Avidan et al. ..................... 380/28 |
| 2009/0268908 | A1* | 10/2009 | Bikel et al. ..................... 380/255 |
| 2012/0102326 | A1* | 4/2012 | Palekar ........................ 713/168 |
| 2012/0254612 | A1* | 10/2012 | Rane et al. .................... 713/168 |

OTHER PUBLICATIONS

Even, O. Goldreich, and A. Lempel, ""A Randomized Protocol for Signing Contracts"", Communications of the ACM, vol. 28, Issue 6, p. 637-647, 1985.
G. Brassard, et al., "All-or-Nothing Disclosure of Secrets," Advances in Cryptology (CRYPTO 86), Aug. 1986, pp. 234-238.
S. Even, et al., "A Randomized Protocol for Signing Contracts," Advances in Cryptology (CRYPTO 82), Aug. 1982, Extended Abstract, pp. 205-210.
GB Intellectual Property Office; Application No. GB1221699.0; Patents Act 1977: Search Report under Section 17; Date Mailed: Apr. 4, 2013; pp. 1-4.

* cited by examiner

*Primary Examiner* — Matthew Smithers
(74) *Attorney, Agent, or Firm* — Cantor Colburn LLP (57) ABSTRACT

A system includes a server connectable to a client, the server configured to allow the client to acquire a message of an index designated by the client among N messages held by the server where N is an integer of two or more. The server includes a classification unit configured to classify the N messages into M classified messages by contents of the messages; a message encryption unit configured to encrypt each of the M classified messages; a message provision unit configured to provide the M encrypted classified messages to the client; and a key sending unit configured to send the client, by oblivious transfer, a message key for decrypting the classified message corresponding to the message of the index designated by the client.

14 Claims, 6 Drawing Sheets

SENDING MESSAGES BY OBLIVIOUS TRANSFER

PRIORITY

This application claims priority to Japanese Patent Application No. 2011-276118, filed 16 Dec. 2011, and all the benefits accruing therefrom under 35 U.S.C. §119, the contents of which in its entirety are herein incorporated by reference.

BACKGROUND

The present invention relates to a system, a server, a client, a method, and a program for sending messages by oblivious transfer.

A protocol called oblivious transfer is known (see, for example, Even, O. Goldreich, and A. Lempel, "A Randomized Protocol for Signing Contracts", Communications of the ACM, Volume 28, Issue 6, pg. 637-647, 1985). The oblivious transfer is a protocol configured to allow a sender apparatus to send a receiver apparatus a message of an index designated by the receiver apparatus among N messages (X1, . . . , XN) held by the sender apparatus, but not to allow the sender apparatus to identify the designated index nor to allow the receiver apparatus to acquire any message of an index other than the designated index.

SUMMARY

In one embodiment, a system includes a server connectable to a client, the server configured to allow the client to acquire a message of an index designated by the client among N messages held by the server where N is an integer of two or more, the server further comprising: a classification unit configured to classify the N messages into M classified messages by contents of the messages; a message encryption unit configured to encrypt each of the M classified messages; a message provision unit configured to provide the M encrypted classified messages to the client; and a key sending unit configured to send the client, by oblivious transfer, a message key for decrypting the classified message corresponding to the message of the index designated by the client.

In another embodiment, a server implemented method of allowing a client to acquire a message of an index designated by the client among N messages held by a server where N is an integer of two or more includes classifying, by the server, the N messages into M classified messages by contents of the messages; encrypting each of the M classified messages; providing the M encrypted classified messages to the client; and sending the client, by oblivious transfer, a message key for decrypting the classified message corresponding to the message of the index designated by the client.

DETAILED DESCRIPTION

With respect to the concept of oblivious transfer discussed above, since N encrypted messages are sent from the sender apparatus to the receiver apparatus, the volume of communications in oblivious transfer is almost proportional to the total data volume of the N messages. Accordingly, the larger the total data volume of the N messages, the larger the communication traffic in the oblivious transfer.

In addition, there are cases where some of the N messages have the same content redundantly. In the oblivious transfer, however, the sender apparatus has to send all the redundant messages to the receiver apparatus. Thus, if there are many redundant messages, the redundancy of communications is high.

A first aspect of the present invention embodiments provides a server that is connectable to a client and that allows the client to acquire a message of an index designated by the client among N messages held by the server where N is an integer of two or more, the server including: a classification unit configured to classify the N messages into M classified messages by contents of the messages; a message encryption unit configured to encrypt each of the M classified messages; a message provision unit configured to provide the M encrypted classified messages to the client; and a key sending unit configured to send the client, by oblivious transfer, a message key for decrypting the classified message corresponding to the message of the index designated by the client. Furthermore, a system including the server and the client, a client included in the system, programs for causing a computer to function as the server and the client, and a method related to the system are provided.

It should be noted that the foregoing outline of the present invention does not list all the features necessary for the present invention, and that subcombinations of these features can also be included in the present invention.

Figure 1:
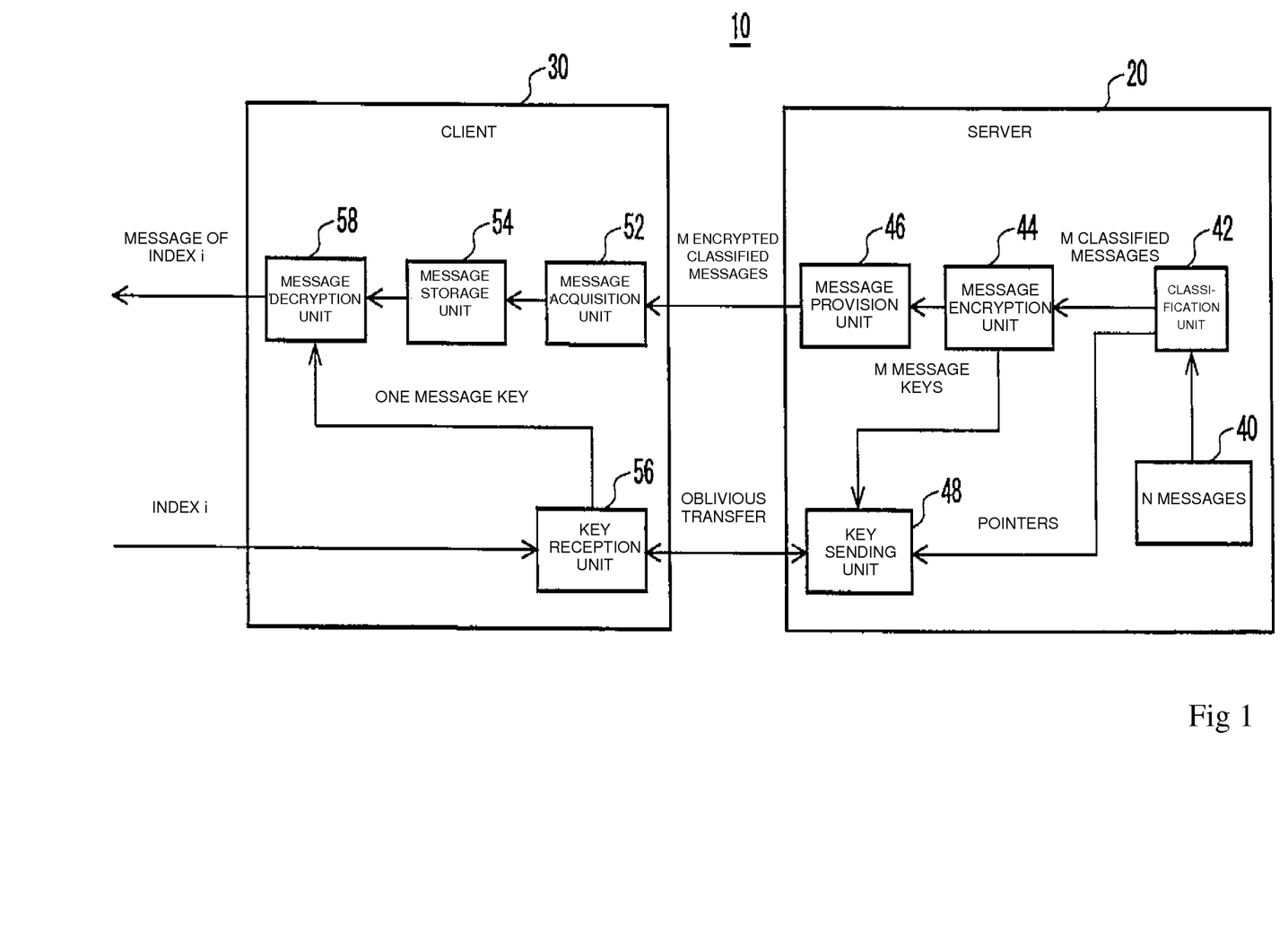
FIG. 1 shows a functional block diagram of an information providing system according to an embodiment of the present invention.

FIG. 1 shows a functional block diagram of an information providing system 10 according to an embodiment. The information providing system 10 according to this embodiment includes a server 20 and a client 30. The information providing system 10 according to this embodiment allows the client 30 to acquire a message of an index designated by the client 30 among N messages held by the server 20. N is an integer of 2 or more. Here, each of the N messages may be any data, any file or the like such as text data, music data or program data. Each of the N messages is assigned unique index. Accordingly, when one of the indexes is designated in the information providing system 10, a corresponding one of the N messages is identified.

The server 20 includes a message storage unit 40, a classification unit 42, a message encryption unit 44, a message provision unit 46, and a key sending unit 48. The client 30 includes a message acquisition unit 52, a classified message storage unit 54, a key reception unit 56, and a message decryption unit 58. The message storage unit 40 of the server 20 stores the N messages. The N messages are written by an administrator or the like of the server 20, for example.

The classification unit 42 of the server 20 classifies the N messages into M classified messages by contents of the massages. Here, M is an integer between 1 and N inclusive. The classification unit 42 generates the M classified messages by deleting a message having the same content (the same data, for example) as another message among the N messages to eliminate redundant messages, for example. In this case, the classification unit 42 also generates pointers indicating correspondences between the N messages and the M classified messages. The classification unit 42 delivers the M classified messages to the message encryption unit 44 and the pointers to the key sending unit 48.

The message encryption unit 44 of the server 20 encrypts each of the M classified messages and delivers the M encrypted classified messages to the message provision unit 46. The message encryption unit 44 also delivers, to the key sending unit 48, M message keys for respectively decrypting the M classified messages. The message provision unit 46 of the server 20 provides the M encrypted classified messages to the client 30. For example, the message provision unit 46 provides the M encrypted classified messages to the client 30 (off-line) prior to designation of an index by the client 30. The message provision unit 46 may provide the M encrypted classified messages to the client 30 (on-line) in response to the designation of the index by the client 30.

The message acquisition unit 52 of the client 30 acquires the M encrypted classified messages provided by the message provision unit 46 of the server 20. For example, the message acquisition unit 52 acquires the M encrypted classified messages prior to the designation of an index by the user or the like. For example, the message acquisition unit 52 may also acquire the M encrypted classified messages in response to the designation of the index by the user or the like. The classified message storage unit 54 of the client 30 stores therein the M encrypted classified messages acquired by the message acquisition unit 52. When acquiring the M encrypted classified messages in response to the designation of the index, the client 30 does not have to include the classified message storage unit 54.

The key sending unit 48 of the server 20 receives the M message keys and the pointers indicating the correspondences between the N messages and the M classified messages. The key reception unit 56 of the client 30 receives from the user or the like, the designation of an index of a message desired to be acquired among the N messages.

By the oblivious transfer, the key sending unit 48 of the server 20 sends the client 30 a message key for decrypting a classified message corresponding to the message of the index designated by the client 30 among the M message keys. The key reception unit 56 of the client 30 receives from the server 20, the message key for the message of the designated index by the oblivious transfer. In other words, the key sending unit 48 and the key reception unit 56 perform delivery of the message key from the server 20 to the client 30 by using a protocol which does not allow the client 30 to acquire any message key other than the message key for the designated index and does not allow the server 20 to identify the designated index. An example of a concrete processing method in the oblivious transfer will be described in detail later.

The key sending unit 48 may send the client 30 one of the pointers which indicates the classified message corresponding to the designated index, together with the message key by the oblivious transfer. In this case, the key sending unit 48 may send the message key including the pointer. The key reception unit 56 receives the pointer together with the message key by the oblivious transfer. This enables the client 30 to identify which one of the M encrypted classified messages can be decrypted by using the received message key.

By using the message key received by the key reception unit 56, the message decryption unit 58 decrypts the classified message corresponding to the message of the designated index among the M encrypted classified messages provided from the server 20. In this case, when the key reception unit 56 receives the pointer together with the message key, the message decryption unit 58 decrypts the classified message indicated by the received pointer. When the key reception unit 56 does not receive the pointer, the message decryption unit 58 may attempt to decrypt all the M classified messages, and acquire one successfully decrypted classified message.

The classified message decrypted in this manner is the same as the message of the designated index among the N messages held by the server 20. Thus, the information providing system 10 allows the client 30 to acquire the message of the designated index, but does not allow the client 30 to acquire the messages other than the message of the designated index nor allow the server 20 to identify the designated index.

Figure 2:
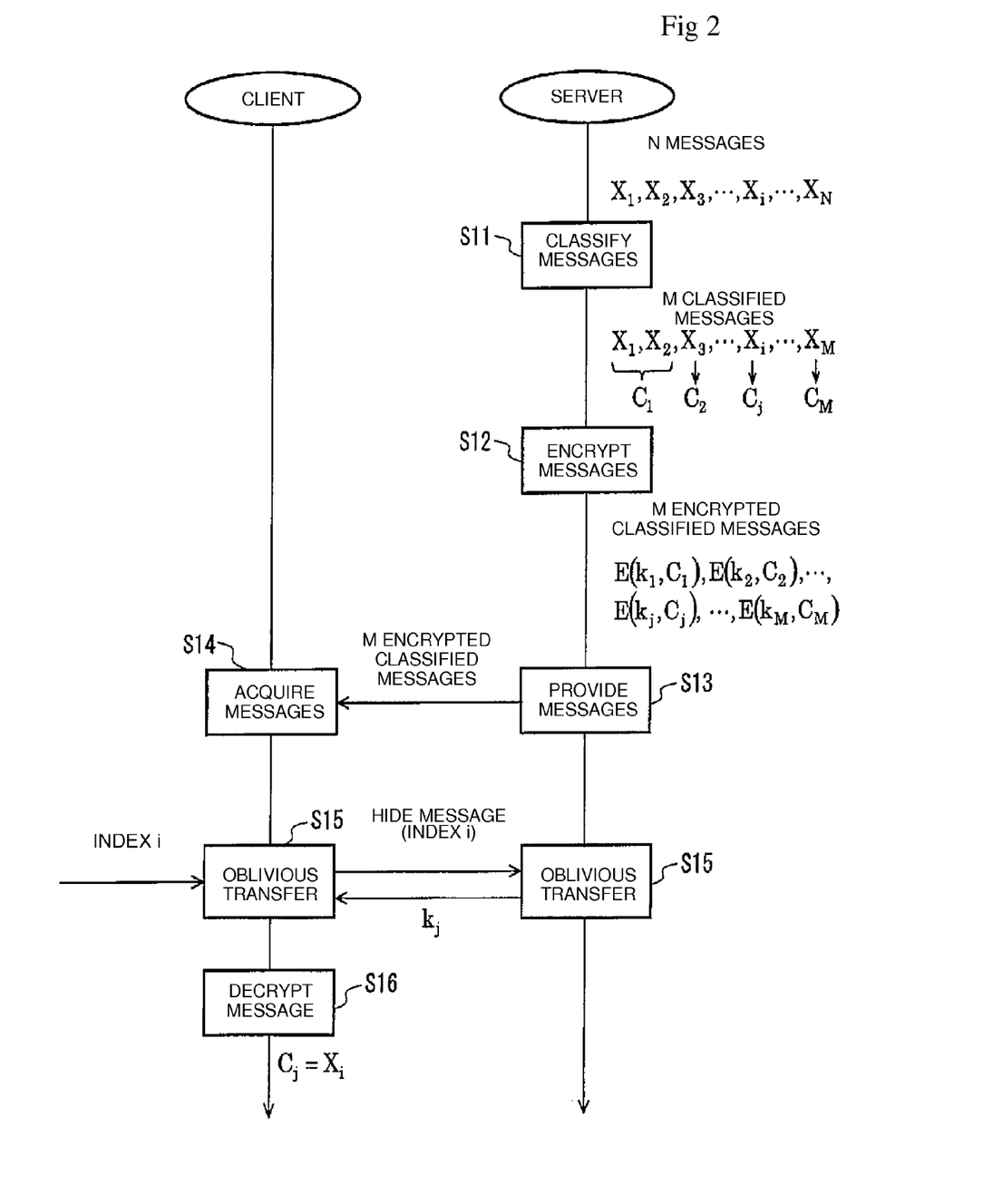
FIG. 2 shows a flow of processing of delivering messages from a server to a client in the information providing system according to this embodiment.

FIG. 2 shows a flow of processing of delivering messages from the server 20 to the client 30 in the information providing system 10 according to this embodiment. In the first place, the server 20 holds the N messages. In this example, the server 20 holds the N messages X1, X2, X3, . . . , Xi, . . . , XN respectively assigned indexes of 1 to N. Here, X denotes a message; a subscript of X, an index of the message; and i, any integer between 1 and N inclusive.

In Block S11, the classification unit 42 of the server 20 classifies the N messages into M classified messages by contents. In this example, the classification unit 42 deletes redundant messages (messages having the same content, for example) from the N messages of X1, X2, X3, . . . , Xi, . . . , XN to generate M classified messages of C1, C2, . . . , Cj, . . . , CM. Here, C denotes a classified message, and a subscript of C denotes an index (a classification index) of the classified message. Also, in Block S11, the classification unit 42 of the server 20 generates pointers indicating correspondences between the N messages and the M classified messages. In this example, a message Xi of an index i among the N messages corresponds to a classified message Cj of a classification index j. Thus, the classification unit 42 of the server 20 generates a pointer indicating that the message Xi of the index i corresponds to the classified message Cj of the classification index j.

In Block S12, the message encryption unit 44 of the server 20 encrypts the M classified messages C1, C2, . . . , Cj, . . . , CM to generate M cipher texts, respectively. The M cipher texts thus generated can be respectively decrypted by using M different message keys k1 to kM. In this example, the message encryption unit 44 of the server 20 generates M cipher texts E(k1, C1), E(k2, C2), . . . , E(kj, Cj), . . . , E(kM, CM). Here, E(k, C) denotes a cipher text generated by encrypting a classified message C by using a message key k. In Block S13, the message provision unit 46 of the server 20 provides the M encrypted classified messages to the client 30. In this example, the message provision unit 46 provides the M encrypted classified messages to the client 30 (off-line) prior to designation of an index by the client 30.

In the off-line processing, the message provision unit 46 of the server 20 may send the client 30, the M encrypted classified messages through a network or may deliver the M encrypted classified messages to the client 30 by writing the M encrypted classified messages to a storage medium. In this case, the message provision unit 46 of the server 20 may also provide the M encrypted classified messages to the client 30 in random order changed from the original arrangement order of the N messages. Thereby, the server 20 can prevent the user or the like of the client 30 from inferring the locations of the messages. Alternatively, instead of the off-line processing, the message provision unit 46 of the server 20 may send the client 30 the M encrypted classified messages through the network (on-line) in response to the designation of the index by the user or the like. In this case, the message provision unit 46 of the server 20 may send the client 30 the M encrypted classified messages arranged in ascending order of data size. Thereby, if a desired classified message corresponding to a message of the designated index has a relatively small data size, the client 30 can acquire the desired message at a relatively early stage in the sending of the M encrypted classified messages.

In Block S14, the message acquisition unit 52 of the client 30 acquires the M encrypted classified messages provided from the message provision unit 46 of the server 20. The message acquisition unit 52 of the client 30 may acquire the M encrypted classified messages from the server 20 through the network (off-line) prior to the designation of the index, or may acquire the M encrypted classified messages written to the storage medium by the server 20 by reading the M encrypted classified messages therefrom. Then, the classified message storage unit 54 of the client 30 stores therein the acquired M encrypted classified messages. Here, instead of the off-line processing, the message acquisition unit 52 of the client 30 may receive the M encrypted classified messages from the server 20 through the network (on-line) in response to the designation of the index in Block S15 to be described later.

In Block S15, the key reception unit 56 of the client 30 receives, for example, from the user, the designation of the index of the message to be acquired among the N messages held by the server 20. In this example, the key reception unit 56 of the server 20 receives designation of "i" as the index. Then, the key sending unit 48 of the server 20 and the key reception unit 56 of the client 30 perform oblivious transfer to deliver a message key for the designated index from the server 20 to the client 30. More specifically, the key sending unit 48 of the server 20 sends the client 30, by the oblivious transfer, the message key for decrypting the classified message corresponding to the message of the index designated by the client 30, among the M message keys. In contrast, the key reception unit 56 of the client 30 receives, by the oblivious transfer, the message key for the message of the designated index from the server 20. Thereby, the key sending unit 48 and the key reception unit 56 can perform the delivery of the message key for the designated index in such a manner as not to allow the client 30 to acquire message keys other than the message key for the designated index nor to allow the server 20 to identify the designated index.

In this example, in response to the reception of the designation of the index i, the key sending unit 48 of the server 20 and the key reception unit 56 of the client 30 perform the delivery of the message key kj from the server 20 to the client 30 by the oblivious transfer, the message key kj being for decrypting the classified message Cj corresponding to the message Xi of the index i. In this example, the key sending unit 48 and the key reception unit 56 can thereby perform the delivery of the message key kj in such a manner as not to allow the client 30 to acquire message keys other than the message key kj for the designated index i nor to allow the server 20 to identify the designated index i. Here, the key sending unit 48 of the server 20 may send the client 30 one of the pointers (a classification index, for example) which indicates the classified message corresponding to the message of the designated index, together with the message key by the oblivious transfer. In this case, the key sending unit 48 of the server 20 may send the message key including the pointer.

The key reception unit 56 receives the pointer together with the message key by the oblivious transfer. This enables the key reception unit 56 of the client 30 to identify which one of the M encrypted classified messages can be decrypted by using the received message key. In Block S16, by using the message key received by the key reception unit 56, the message decryption unit 58 of the client 30 decrypts the classified message corresponding to the message of the designated index among the M encrypted classified messages provided from the server 20. In this case, when the key reception unit 56 receives the pointer together with the message key, the message decryption unit 58 of the client 30 decrypts the classified message indicated by the received pointer. When, the key reception unit 56 does not receive the pointer, the message decryption unit 58 of the client 30 may attempt to decrypt all the M classified messages to successfully decrypt one of the classified messages.

In this example, the message decryption unit 58 of the client 30 can decrypt the classified message Cj. Here, the classified message Cj decrypted in this manner is the same as the message Xi of the designated index i among the N messages held by the server 20. Thus, the information providing system 10 allows the client 30 to acquire the message Xi of the designated index i, but does not allow the client 30 to acquire the messages other than the message Xi of the designated index i nor allow the server 20 to identify the designated index i. As described above, in the information providing system 10 according to this embodiment, redundant messages are no longer needed to be sent from the server 20 to the client 30. Thus, low redundancy oblivious transfer can be achieved. Thereby, when executing the oblivious transfer of the N messages, the information providing system 10 can efficiently perform communications.

Figure 3:
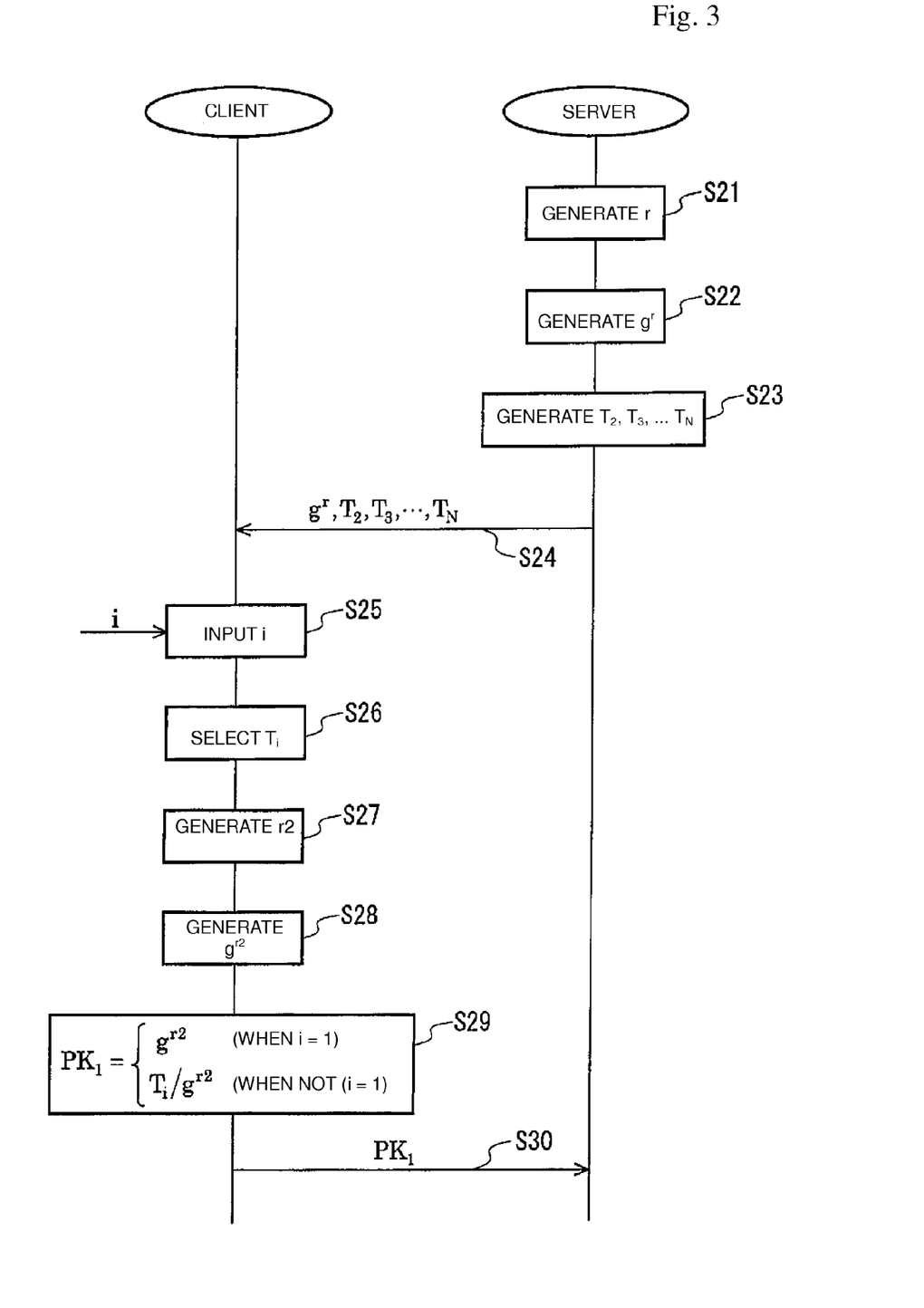
FIG. 3 shows a flow of processing of delivering message keys from the server to the client by oblivious transfer.
Figure 4:
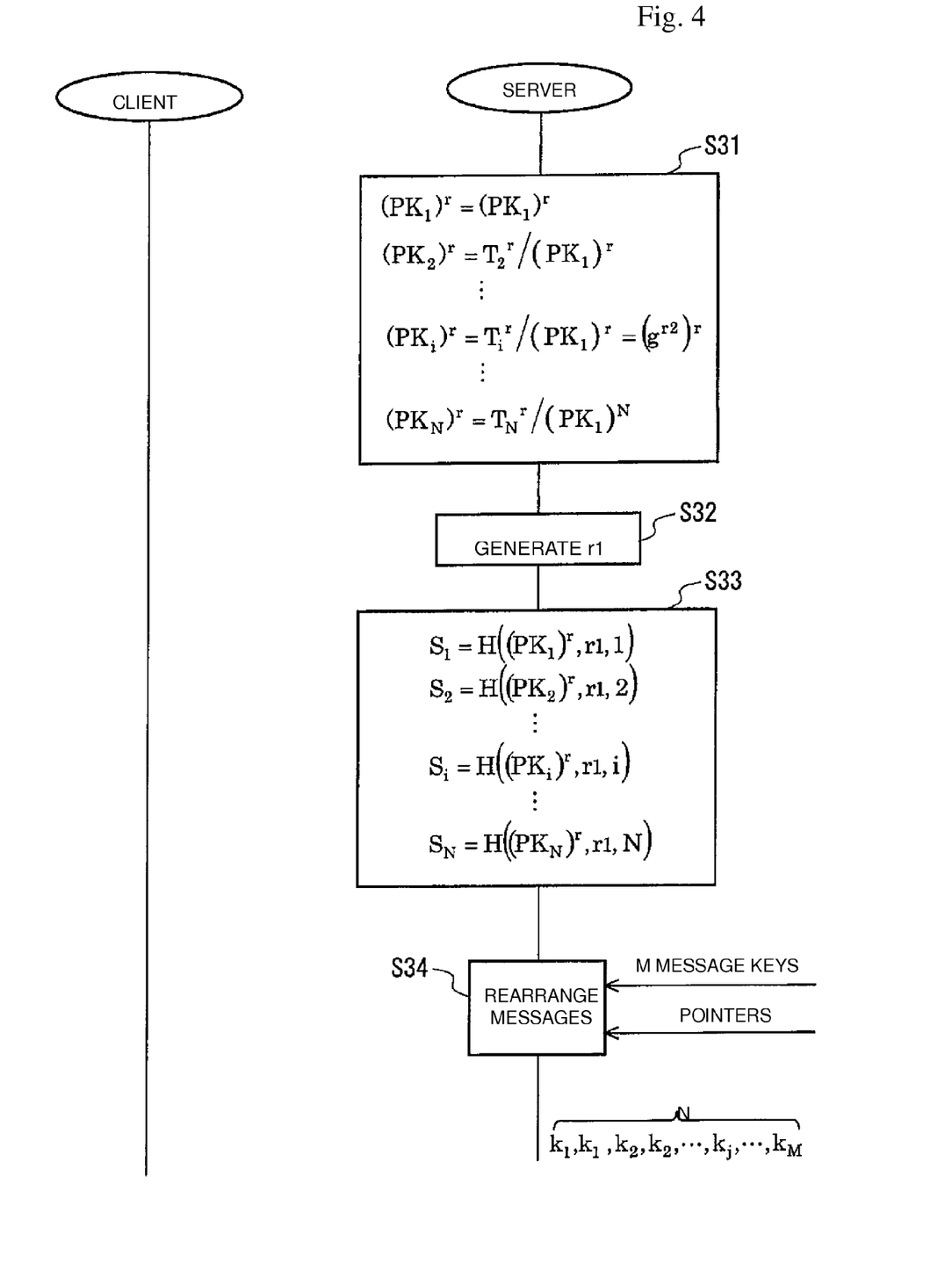
FIG. 4 shows a flow subsequent to that in FIG. 3.
Figure 5:
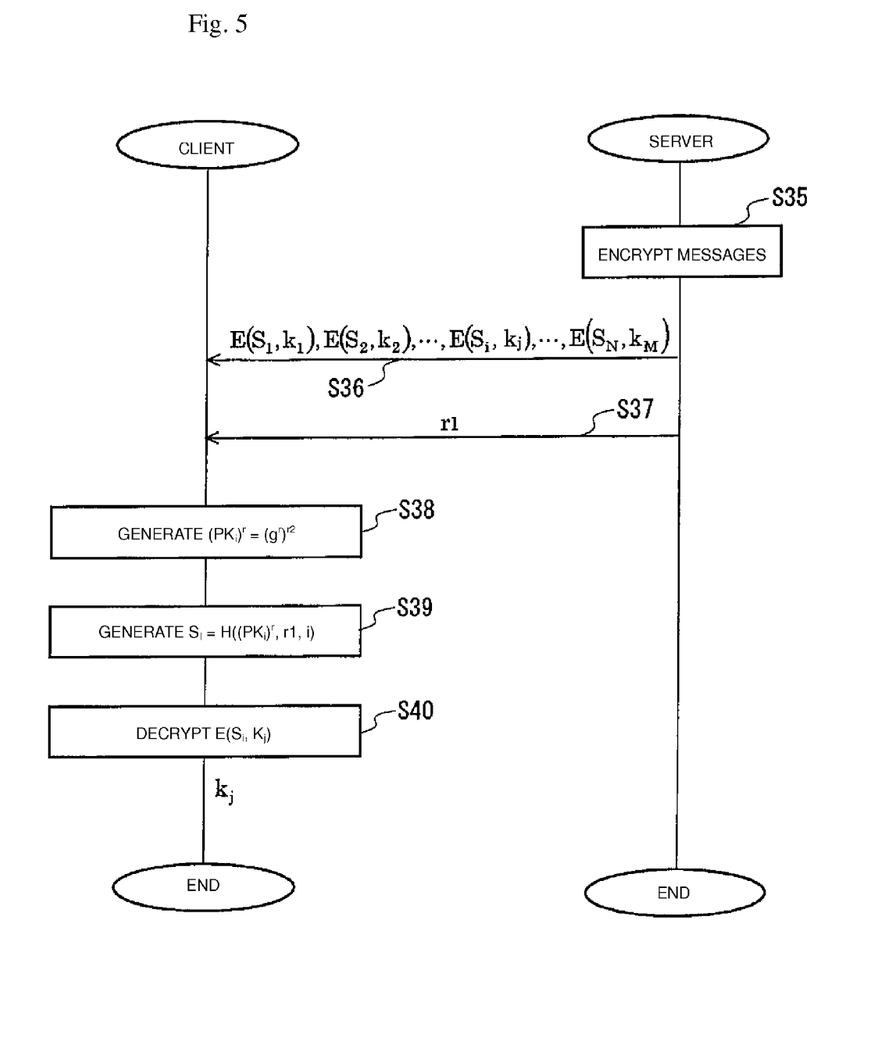
FIG. 5 shows a flow subsequent to that in FIG. 4.

FIG. 3 shows a flow of processing of delivering the message keys from the server 20 to the client 30 by the oblivious transfer. FIG. 4 shows a flow subsequent to that in FIG. 3. FIG. 5 shows a flow subsequent to that in FIG. 4.

Hereinbelow, an example of communication processing of the oblivious transfer executed in Block S15 will be described with reference to FIGS. 3, 4, and 5. Note that the oblivious transfer executed in this embodiment may be achieved by not only the processing to be described below but also another processing.

In Block S21, the server 20 firstly generates "r". In Block S22, the server 20 generates "gr" by raising "g" to the power of "r". Here, "g" denotes an element to generate an order "q". Note that "q" is any prime, and "g" is a value defined in common by the server 20 and the client 30. In addition, "r" is a value selected randomly from a cyclic group Zq of the order "q". In addition, "r1" and "r2" to be described later are also values selected randomly from the cyclic group Zq of the order "q". In Block S23, the server 20 generates "T2, T3, T4, . . . , TN". Any integers are used as "T2, T3, T4, . . . , TN" and the number thereof is (N−1). Indexes between 2 to N inclusive are assigned to "T2, T3, T4, . . . , TN". In Block S24, the server 20 sends the client 30, "gr" and "T2, T3, T4, . . . , TN". Notably, it is extremely difficult for the client 30 to calculate "r" from "gr" due to the nature of a discrete logarithm. Thus, it can be said that "r" is hidden from the client 30.

In Block S25, the client 30 receives the designation of the index for identifying the message the user wishes to acquire among the N messages. In this example, the client 30 receives the designation of "i" as the index. Here, "i" is any integer between 1 and N inclusive. In Block S26, the client 30 selects "Ti" including the i-th index from "T2, T3, T4, . . . , TN". If the designated index i is 1 (i=1), the client 30 does not select a value in Block S26. In Block S27, the client 30 generates "r2". In Block S28, the client 30 generates "gr2" by raising "g" to the power of "r2".

In Block S29, the client 30 calculates "PK1". Specifically, when i=1, the client 30 sets "gr2" as "PK1" (PK1=gr2). When i≠1, the client 30 calculates "Ti/gr2" and sets the calculated result "Ti/gr2" as "PK1" (PK1=Ti/gr2). In Block S30, the client 30 sends the server 20 "PK1". Note that it is extremely difficult for the server 20 to calculate "r2" from "gr2" due to the nature of the discrete logarithm. Thus, it can be said that "r2" is hidden from the server 20. In Block S31, the server 20 calculates (PK1)r, (PK2)r, . . . , (PKi)r, . . . , (PKN)r based on "r" and "T2, T3, T4, . . . , TN" as well as the received "PK1" as in the following equations (1):

$$(PK_1)^r = (PK_1)^r \quad (1)$$
$$(PK_2)^r = T_2^r/(PK_1)^r$$
$$\vdots$$
$$(PK_i)^r = T_i^r/(PK_1)^r = (g^{r2})^r$$
$$\vdots$$
$$(PK_N)^r = T_N^r/(PK_1)^r$$

Here, (PKi)r is g(r2·r) as in the following equation (2):

$$(PK_i)^r = T_i^r/(PK_1)^r \quad (2)$$
$$= T_i^r/(T_i/g^{r2})^r$$
$$= (g^{r2})^r$$
$$= g^{(r2·r)}$$

In Block S32, the server 20 generates "r1". In Block S33, the server 20 generates N cipher keys "S1, S2, . . . , Si, . . . , SN" as shown in the following equations (3). Here, in the following equations (3), H(x, y, z) denotes a hash function with variables x, y, z:

$$S_1 = H((PK_1)^r, r1, 1) \quad (3)$$
$$S_2 = H((PK_2)^r, r1, 2)$$
$$\vdots$$
$$S_i = H((PK_i)^r, r1, i)$$
$$\vdots$$
$$S_N = H((PK_N)^r, r1, N)$$

In Block S34, the server 20 rearranges the M message keys "k1, k2, . . . , kM" for decrypting the M respective classified messages, in the order of the indexes of the N messages. In this case, the server 20 rearranges the message keys in reference to the pointers indicating the correspondences between the N messages and the M classified messages.

In Block S35, the server 20 encrypts the N message keys rearranged in the order of the indexes of the N messages, on the basis of the N cipher keys "S1, S2, . . . , Si, . . . , SN" generated in Block S33, respectively. In other words, the server 20 encrypts the message key for decrypting the classified message corresponding to the first message by using the first cipher key "S1". The server 20 also encrypts the message key for decrypting the classified message corresponding to the i-th message by using the i-th cipher key "Si". The server 20 also encrypts the message key for decrypting the classified message corresponding to the N-th message by using the N-th cipher key "SN". Thereby, the server 20 can generate N cipher texts as shown in the following expressions (4):

$$E(S_1, k_1) \quad (4)$$
$$E(S_2, k_2)$$
$$\vdots$$
$$E(S_i, k_j)$$
$$\vdots$$
$$E(S_N, k_M)$$

In this case, the server 20 encrypts not only the N message keys but also the pointers (the classification indexes, for example) indicating the classified messages which can be decrypted based on the message keys, respectively. In this case, the server 20 may include the pointers in the message keys. In Block S36, the server 20 sends the client 30 the generated N cipher texts. In Block S37, the server 20 sends the client 30 "r1".

In contrast, in Block S38, the client 30 calculates "(gr)r2" by raising "gr" to the power of "r2". Here, (PKi)r is g(r2·r) as shown by equation (2). In other words, "(gr)r2" calculated by the client 30 in Block S38 denotes "(PKi)r". In Block S39, the client 30 generates the cipher key "Si" for the index i by using "(PKi)r", "r1", and "i". Note that the client 30 cannot generate values ((PK1)r, (PK2)r, (PKM)r, for example) other than the value (PKi)r, and thus cannot generate cipher keys other than the cipher key "Si" for the index i. Accordingly, the client 30 cannot acquire message keys other than the message key kj for decrypting the classified message corresponding to the message of the index i.

In Block S40, the client 30 decrypts the cipher text E(Si, kj) by using the cipher key "Si" generated in Block S39 so as to acquire the message key kj. Thereby, the client 30 can acquire the message key kj for decrypting the classified message Cj corresponding to the message Xi of the index i. In this case, when the cipher text (Si, kj) includes a pointer, the client 30 decrypts the cipher text (Si, kj) to acquire the pointer as well.

As described above, the server 20 and the client 30 can perform the delivery of the message key kj for the designated index i in such a manner as not to allow the client 30 to acquire the message keys other than the message key kj for the designated index i nor to allow the server 20 to identify the designated index i.

Figure 6:
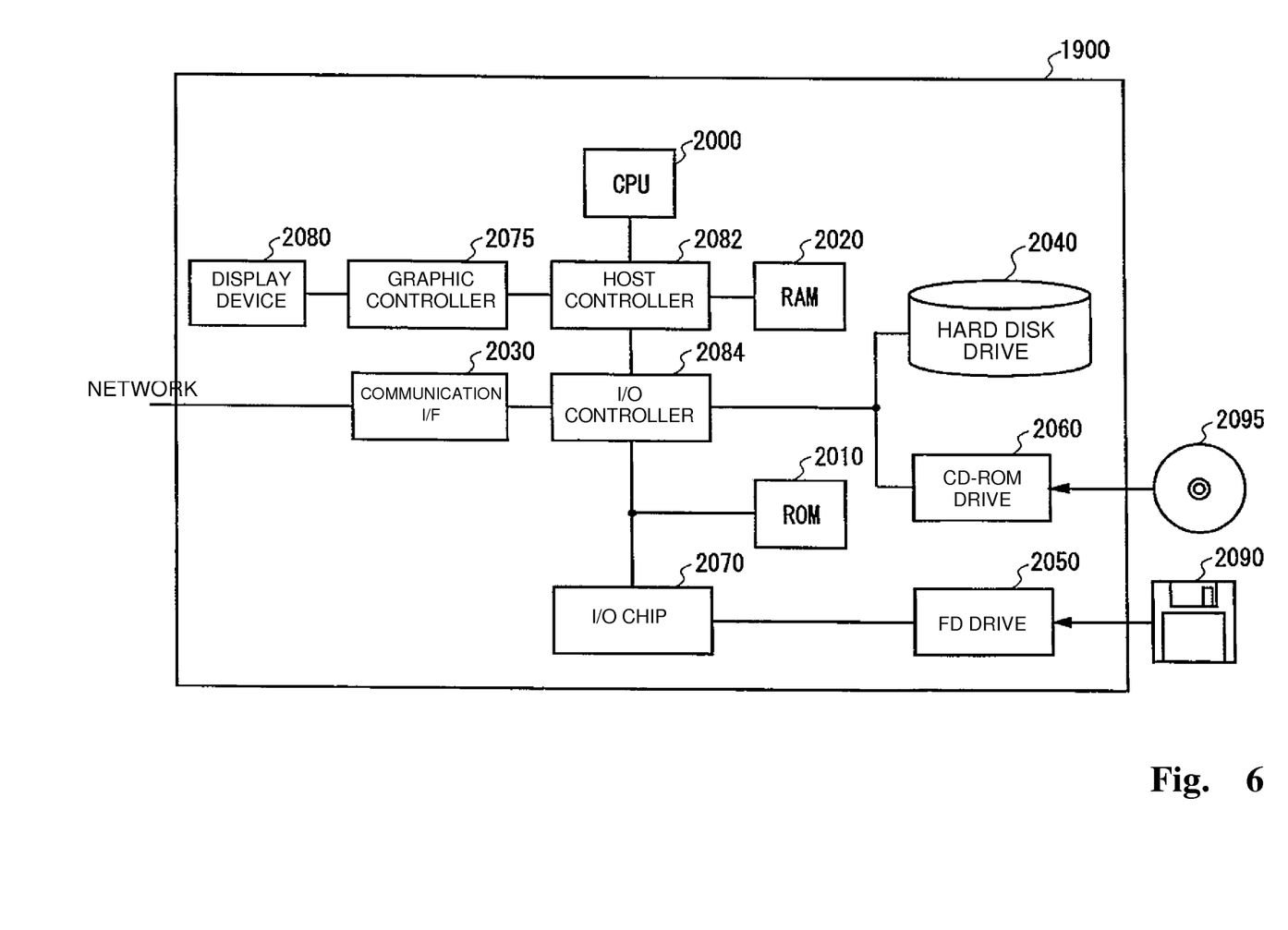
FIG. 6 shows an example of a hardware configuration of a computer according to an embodiment.

FIG. 6 shows a hardware configuration of a computer 1900 according to this embodiment. The computer 1900 according to this embodiment includes a CPU peripheral portion including a CPU 2000, a RAM 2020, and a graphic controller 2075 which are connected with each other via a host controller 2082, as well as a display device 2080. The computer 1900 further includes an input/output portion including a communication interface 2030, a hard disk drive 2040, and a CD-ROM drive 2060 that are connected to the host controller 2082 via an input/output controller 2084. The computer 1900 further includes a legacy input/output portion including a ROM 2010 connected to the input/output controller 2084, a flexible disk drive 2050, and an input/output chip 2070.

The host controller 2082 connects the RAM 2020, the CPU 2000 and the graphic controller 2075 together, the CPU 2000 and the graphic controller 2075 which access the RAM 2020 at a high transfer rate. The CPU 2000 operates based on programs stored in the ROM 2010 and the RAM 2020 and controls each of the components. The graphic controller 2075 acquires image data generated by the CPU 2000 and the like on a frame buffer provided in the RAM 2020 and displays the image data on the display device 2080. Alternatively, the graphic controller 2075 may also include the frame buffer for storing the image data generated by the CPU 2000 and the like.

The input/output controller 2084 connects the communication interface 2030, the hard disk drive 2040, and the CD-ROM drive 2060 which are relatively high speed input/output devices, to the host controller 2082. The communication interface 2030 communicates with another device via the network. The hard disk drive 2040 stores therein programs and data used by the CPU 2000 in the computer 1900. The CD-ROM drive 2060 reads a program and the data from a CD-ROM 2095 and then provides them to the hard disk drive 2040 via the RAM 2020.

Relatively low speed input/output devices such as the ROM 2010, the flexible disk drive 2050, and the input/output chip 2070 are connected to the input/output controller 2084. The ROM 2010 stores therein a boot program executed by the computer 1900 at a start-up time of the computer 1900 and/or programs depending on the hardware of the computer 1900, and the like. The flexible disk drive 2050 reads a program and data from a flexible disk 2090 and then provides them to the hard disk drive 2040 via the RAM 2020. The input/output chip 2070 connects to the input/output controller 2084, the flexible disk drive 2050 as well as the various input/output devices via, for example, a parallel port, a serial port, a keyboard port, a mouse port and the like.

The programs provided to the hard disk drive 2040 via the RAM 2020 have been stored in a recording medium such as the flexible disk 2090, the CD-ROM 2095 or an IC card. The programs are provided by the user. Each of the programs is read from the recording medium, installed on the hard disk drive 2040 in the computer 1900 via the RAM 2020, and executed by the CPU 2000.

The program installed on the computer 1900 to cause the computer 1900 to function as the server 20 includes a message storage module, a classification module, a message encryption module, a message provision module, and a key sending module. The program or the modules cause the computer 1900 to function as the message storage unit 40, the classification unit 42, the message encryption unit 44, the message provision unit 46, and the key sending unit 48 by working in cooperation with the CPU 2000 or the like.

Information processing described in the program is read by the computer 1900 and thereby functions as the message storage unit 40, the classification unit 42, the message encryption unit 44, the message provision unit 46, and the key sending unit 48 which are concrete means achieved by the software and the aforementioned hardware resources in cooperation with each other. Information computation or processing is achieved by the concrete means according to the usage of the computer 1900 in this embodiment, and thereby the specific server 20 according to the usage thereof is established.

The program installed on the computer 1900 and causing the computer 1900 as the client 30 includes a message acquisition module, a classified message storage module, a key reception module, and a message decryption module. The program or the modules causes the computer 1900 or the like to function as the message acquisition unit 52, the classified message storage unit 54, the key reception unit 56, and the message decryption unit 58 by working in cooperation with the CPU 2000 or the like.

Information processing described in the program is read by the computer 1900 and thereby functions as the message acquisition unit 52, the classified message storage unit 54, the key reception unit 56, and the message decryption unit 58 which are concrete means achieved by the software and the aforementioned hardware resources in cooperation with each other. Information computation or processing is achieved by the concrete means according to the usage of the computer 1900 in this embodiment, and thereby the specific client 30 according to the usage thereof is established.

In an example, when the computer 1900 communicates with an external device or the like, the CPU 2000 executes a communication program loaded on the RAM 2020 and instructs the communication interface 2030 to execute communication processing in accordance with processing details described in the communication program. Under control of the CPU 2000, the communication interface 2030 reads transmission data stored in a transmission buffer area or the like provided in the storage device such as the RAM 2020, the hard disk drive 2040, the flexible disk 2090 or the CD-ROM 2095, and then transmits the data to the network. Alternatively, the communication interface 2030 writes data received from the network, to a reception buffer area provided in the storage device. As described above, the communication interface 2030 may transfer data to and from the storage device by a direct memory access (DMA) method. Alternatively, the CPU 2000 may transfer data by reading data from a storage device or a communication interface 2030 which is a transfer source and writing the data to a communication interface 2030 or a storage device which is a transfer destination.

The CPU 2000 causes the RAM 2020 to read all or necessary part of data of a file, a database or the like stored in the external storage device such as the hard disk drive 2040, the CD-ROM drive 2060 (the CD-ROM 2095) or the flexible disk drive 2050 (the flexible disk 2090) through the DMA transfer or the like, and performs various processing on the data in the RAM 2020. The CPU 2000 then writes the data subjected to the processing back to the external device through the DMA transfer or the like. The RAM 2020 can be regarded as a medium that temporarily holds the data in the external storage device in the processing described above. Thus, in this embodiment, the RAM 2020, the external storage device, and the like are collectively referred to as a memory, a storage unit, a storage device or the like. The various programs and information such as data, tables, and databases in this embodiment are stored in the storage device and are to be subjected to information processing. Note that some data in the RAM 2020 may be held in a cache memory and be read and written therefrom and thereto by the CPU 2000. The cache memory serves as part of the RAM 2020 also in such a mode. Thus, the cache memory is also included in the RAM 2020, the memory and/or the storage device in this embodiment, unless otherwise distinguished.

The CPU 2000 performs various processing designated according to command strings of the programs on the data read from the RAM 2020 and writes the data back to the RAM 2020, the processing including various computations, information processing, a conditional judgment, information search and replacement, and the like described in this embodiment. For example, in the case of the conditional judgment, the CPU 2000 judges whether or not each variable shown in this embodiment satisfies a condition that the variable is, for example, larger than, smaller than, not less than, not more than or equal to another variable or a constant. If the condition holds (or does not hold) true, the processing branches to a different command string, or a subroutine is invoked.

The CPU 2000 can also search for information stored in a file, a database or the like in the storage device. For example, suppose a case where the storage device stores therein multiple entries each having an attribute value of a first attribute and an attribute value of a second attribute which are associated with each other. In this case, the CPU 2000 searches the entries stored in the storage device for an entry satisfying a certain condition of designating an attribute value of the first attribute, and then reads an attribute value of the second attribute stored in the found entry. Thereby, the CPU 2000 can acquire the attribute value of the second attribute which is associated with the first attribute and satisfies the condition.

The program and the modules described above may be stored in an external recording medium. As the recording medium, an optical recording medium such as a DVD or a CD, a magneto-optical recording medium such as an MO, a tape medium, a semiconductor memory such as an IC card, or the like may be used as well as the flexible disk 2090 and the CD-ROM 2095. In addition, a storage device such as a hard disk or a RAM provided in a server system connected to a dedicated communication network or the Internet may be used as the recording medium to provide the computer 1900 with the program through the network.

The description has heretofore been given by using the embodiment. However, a technical scope of the present invention is not limited to a scope of the embodiment described above. It is obvious to those skilled in the art that various modifications or improvements can be additionally provided to the aforementioned embodiment. From the description of the scope of claims, it is apparent that the technical scope of the present invention should include embodiments with such modifications or improvements. From the description of the scope of claims, it is apparent that the technical scope of the present invention should include embodiments with such modifications or improvements.

It should be noted that various processing such as operations, procedures, steps, stages and the like in the device, the system, the program, and the method which are shown in the scope of claims, the specification, and the drawings can be achieved in any order, except cases where an explicit description by specially stating "before," "prior to," or the like is provided to the order of executing or where output of preceding processing is used for subsequent processing. Even if a description is given of a flow of operations in the scope of claims, the specification, and the drawings by conveniently using "firstly," "next," or the like, the description does not mean that the operations indispensably need to be performed in the order.

The invention claimed is:

1. A system, comprising:
 a server connectable to a client, the server configured to allow the client to acquire a message of an index designated by the client among N messages held by the server where N is an integer of two or more, the server further comprising:
  a classification unit configured to classify the N messages into M classified messages by contents of the messages;
  a message encryption unit configured to encrypt each of the M classified messages;
  a message provision unit configured to provide the M encrypted classified messages to the client; and
  a key sending unit configured to send the client, by oblivious transfer, a message key for decrypting the classified message corresponding to the message of the index designated by the client;
  wherein the message provision unit provides the client with the M encrypted classified messages arranged in one or more of: ascending order of data size, and random order changed from the original arrangement order of the N messages.

2. The system according to claim 1, wherein the client comprises:
 a key reception unit configured to receive the message key for the message of the designated index from the server by the oblivious transfer; and
 a message decryption unit configured to decrypt the classified message corresponding to the message of the designated index by using the received message key among the M encrypted classified messages provided from the server.

3. The system according to claim 2, wherein the key sending unit sends the client a pointer together with the message key by the oblivious transfer, the pointer indicating the classified message which is decryptable by using the message key sent to the client among the M encrypted classified messages.

4. The system according to claim 3, wherein the key reception unit receives the pointer together with the message key, and the message decryption unit decrypts the classified message indicated by the pointer, by using the received message key.

5. The system according to claim 1, wherein the message provision unit sends the client the M encrypted classified messages through a network.

6. The system according to claim 5, wherein the message provision unit sends the client the M encrypted classified messages before the client designates the index.

7. A system, comprising:
 a server connectable to a client, the server configured to allow the client to acquire a message of an index designated by the client among N messages held by the server where N is an integer of two or more, the server further comprising:
  a classification unit configured to classify the N messages into M classified messages by contents of the messages;
  a message encryption unit configured to encrypt each of the M classified messages;
  a message provision unit configured to provide the M encrypted classified messages to the client; and
  a key sending unit configured to send the client, by oblivious transfer, a message key for decrypting the classified message corresponding to the message of the index designated by the client; and
  a classified message storage unit configured to store the M encrypted classified messages in advance prior to the designation of the index.

8. A server implemented method of allowing a client to acquire a message of an index designated by the client among N messages held by a server where N is an integer of two or more, the method comprising:
 classifying, by the server, the N messages into M classified messages by contents of the messages;
 encrypting each of the M classified messages;
 providing the M encrypted classified messages to the client; and
 sending the client, by oblivious transfer, a message key for decrypting the classified message corresponding to the message of the index designated by the client;
 wherein the server provides the client with the M encrypted classified messages arranged in one or more of: ascending order of data size, and random order changed from the original arrangement order of the N messages.

9. The method according to claim 8, wherein the client is configured to:
 receive the message key for the message of the designated index from the server by the oblivious transfer; and decrypt the classified message corresponding to the message of the designated index among the M encrypted classified messages provided from the server, by using the received message key.

10. The method according to claim 9, wherein the server sends the client a pointer together with the message key by the oblivious transfer, the pointer indicating the classified message which is decryptable by using the message key sent to the client among the M encrypted classified messages.

11. The method according to claim 10, wherein the server is configured to receive the pointer together with the message key, and the message decryption unit is configured to decrypt the classified message indicated by the pointer, by using the received message key.

12. The method according to claim 8, wherein the server sends the client the M encrypted classified messages through a network.

13. The method according to claim 12, wherein the server sends the client the M encrypted classified messages before the client designates the index.

14. A server implemented method of allowing a client to acquire a message of an index designated by the client among N messages held by a server where N is an integer of two or more, the method comprising:
- classifying, by the server, the N messages into M classified messages by contents of the messages;
- encrypting each of the M classified messages;
- providing the M encrypted classified messages to the client;
- sending the client, by oblivious transfer, a message key for decrypting the classified message corresponding to the message of the index designated by the client; and
- store the M encrypted classified messages in advance prior to the designation of the index.

* * * * *